(12) United States Patent
King

(10) Patent No.: US 6,540,249 B2
(45) Date of Patent: Apr. 1, 2003

(54) COLLAPSIBLE CART WITH SHELF

(75) Inventor: David L. King, Arlington Heights, IL (US)

(73) Assignee: ICB, LLC, Arlington Heights, IL (US)

(*) Notice: Subject to any disclaimer, the term of this patent is extended or adjusted under 35 U.S.C. 154(b) by 0 days.

(21) Appl. No.: 10/014,157

(22) Filed: Oct. 30, 2001

(65) Prior Publication Data

US 2002/0084607 A1 Jul. 4, 2002

Related U.S. Application Data

(63) Continuation-in-part of application No. 09/316,413, filed on May 21, 1999, now Pat. No. 6,457,737.

(51) Int. Cl.$^7$ .............................. B62B 1/12
(52) U.S. Cl. ............... 280/651; 280/79.3; 280/47.19; 280/47.35; 211/153
(58) Field of Search ............... 280/651, 47.19, 280/47.35, 79.3; 211/42, 134, 135, 151, 153; D34/19, 20, 21, 22; 248/441.1; 312/208.1, 233, 351.11, 351.12, 351.13; 434/429, 430, 432

(56) References Cited

U.S. PATENT DOCUMENTS

| | | | |
|---|---|---|---|
| 3,436,092 A | 4/1969 | Werner | 280/36 |
| 3,827,376 A | 8/1974 | Solomon | 108/91 |
| 3,827,573 A | 8/1974 | Guerette | 211/149 |
| 4,008,671 A | 2/1977 | Baldini | 108/113 |
| 4,151,803 A | 5/1979 | Ferrera et al. | 108/41 |
| 4,202,278 A | 5/1980 | Wadenhed | 108/102 |
| 4,236,460 A | 12/1980 | Poupko | 108/41 |
| 4,740,010 A | 4/1988 | Moskovitz | 280/641 |
| 5,016,948 A | 5/1991 | Welch et al. | 312/250 |
| 5,315,936 A | 5/1994 | Smith | 108/165 |
| 5,429,432 A | 7/1995 | Johnson | 312/235.3 |
| 5,558,418 A | * 9/1996 | Lambright et al. | 312/321.5 |
| 5,738,230 A | 4/1998 | Goldstein | 211/149 |
| 5,765,702 A | 6/1998 | Bustos et al. | 211/181.1 |
| 5,806,864 A | 9/1998 | Zielinski et al. | 280/42 |
| 5,816,419 A | 10/1998 | Lamson | 211/150 |
| 5,848,798 A | 12/1998 | Halvorson, Jr. et al. | 280/47.35 |
| D404,874 S | 1/1999 | Sandy | D34/21 |

FOREIGN PATENT DOCUMENTS

| | | | |
|---|---|---|---|
| DE | 19 39 148 A | 2/1971 | A47B/3/00 |
| DE | 24 53 759 A | 1/1976 | A47B/31/04 |
| FR | 61 885 E | 5/1955 | 9/4 |
| FR | 2 180 397 A | 11/1973 | A47B/34/04 |

* cited by examiner

Primary Examiner—Brian L. Johnson
Assistant Examiner—J. Allen Shriver
(74) Attorney, Agent, or Firm—Pauley Petersen Kinne & Erickson

(57) ABSTRACT

A collapsible cart for transporting books, files, and other items comprising a cabinet spine, at least one collapsible shelf, at least one fastener, and a plurality of wheels. The cabinet spine has a first surface whereupon at least one collapsible shelf is pivotally mounted. The collapsible shelf is movable between a first position generally perpendicular with respect to the cabinet spine and a second position generally parallel with respect to the cabinet spine. A fastener is attached to the cabinet spine and is designed to be coupled with the collapsible shelf when in the second position. A plurality of wheels are mounted underneath the collapsible cart to allow the cart to be transported from one location to another location. In one embodiment of this invention, first and second doors are pivotally mounted to each side of the cabinet spine. The collapsible cart can be placed in a collapsed position by moving the first collapsible shelf to the second position, and the first and second doors to a closed position.

22 Claims, 12 Drawing Sheets

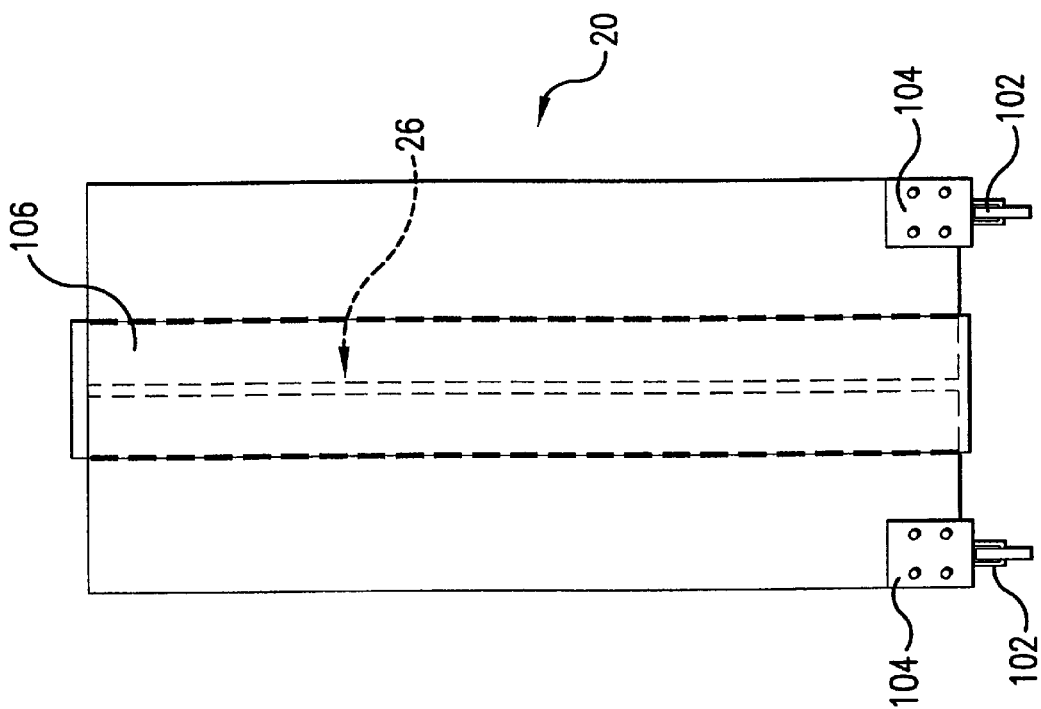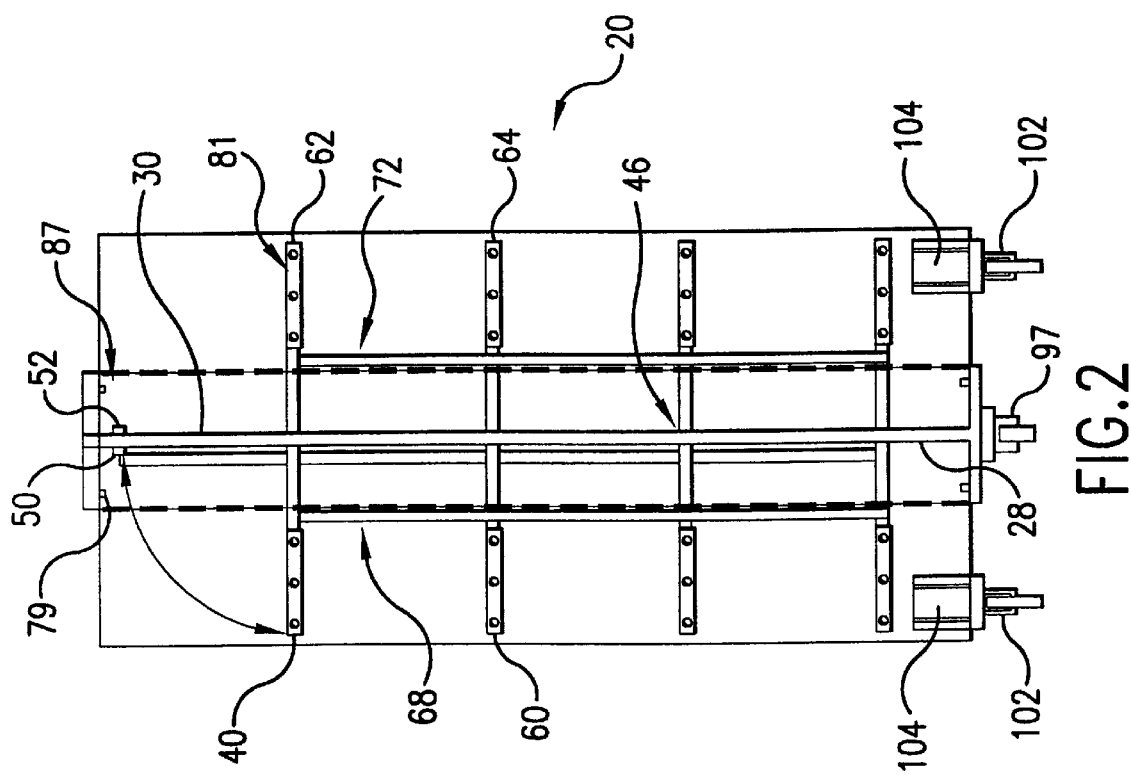

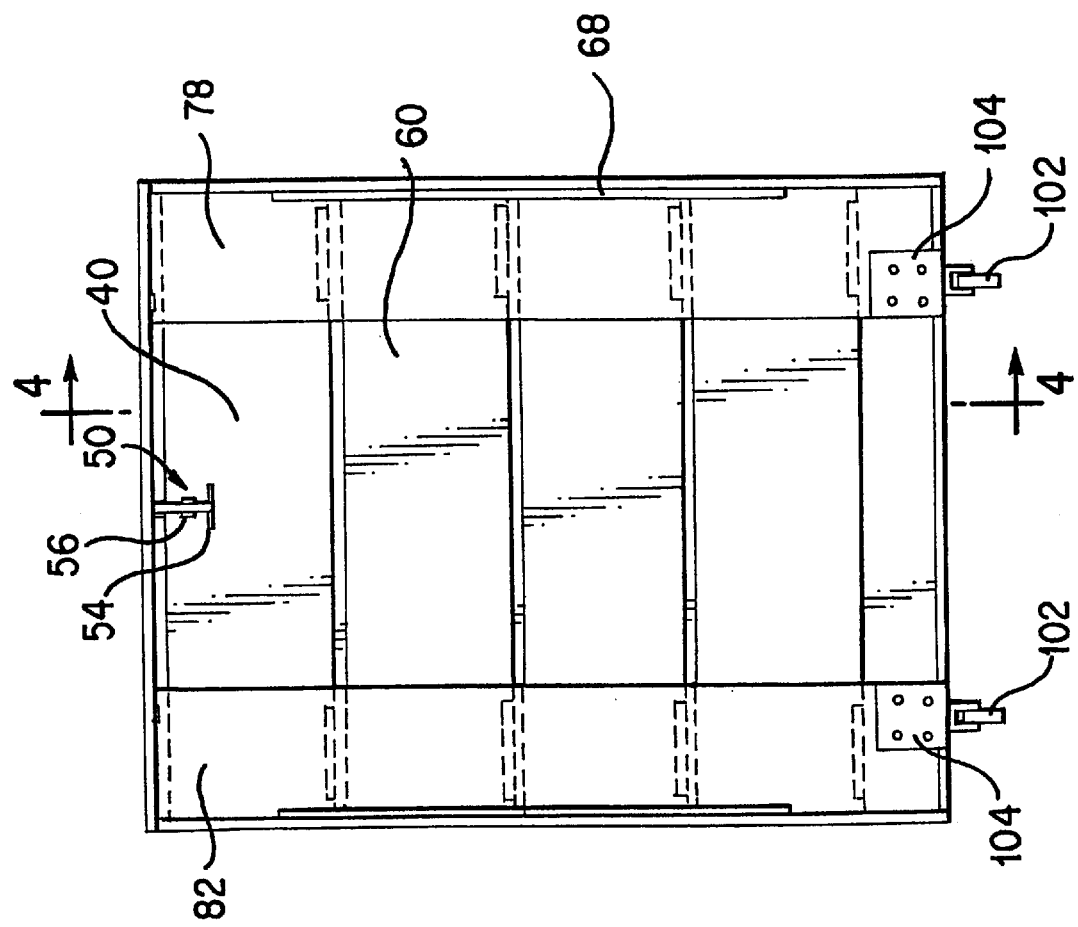
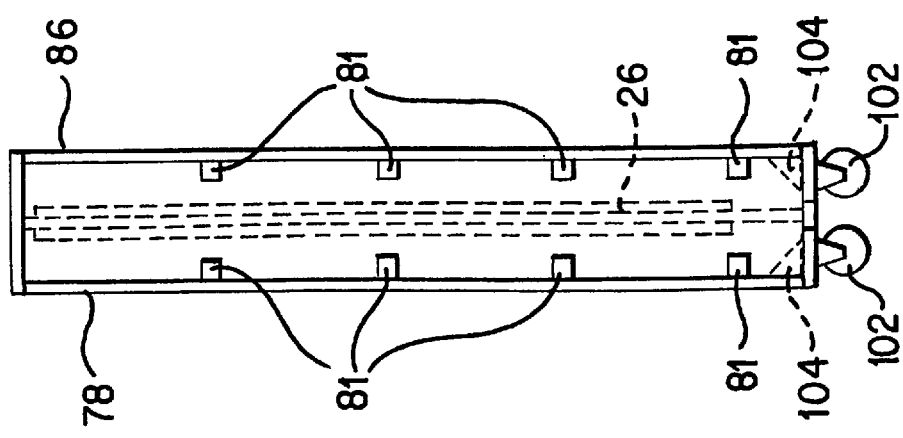

COLLAPSIBLE CART WITH SHELF

This is a continuation-in-part of U.S. patent application Ser. No. 09/316,413, filed May 21, 1999 now U.S. Pat. No. 6,457,737.

BACKGROUND OF THE INVENTION

1. Field of the Invention

This invention generally relates to a collapsible cart for transporting books, files, or other items from one location to another location. More particularly, this invention relates to a collapsible cart having shelves which pivot from a first position generally perpendicular with respect to a cabinet spine to a second position generally parallel with respect to the cabinet spine, doors which close flat against the shelves and the cabinet spine, and wheels mounted underneath the collapsible cart.

2. Description of Prior Art

Collapsible carts used to transport items from one location to another have been known in the art for many years. These collapsible carts vary in size and design. Many of these collapsible carts are designed to carry lightweight loads, and therefore do not have much structural support. Typically these collapsible carts are not designed for transporting shelves full of books from one location to another in that they do not have a cabinet spine on which to rest books against. In addition, the shelves of these collapsible carts often lack sufficient support structures such as side doors with support bodies designed to support the full weight of a shelf of books. Moreover, many of these collapsible carts are not easily transported from one location to another when in a collapsed position.

U.S. Pat. No. 3,827,376 discloses a shelf rack in which the shelves can be collapsed to an essentially vertical position and the end frames supporting the shelves are connected by an essentially diagonal rail whereby the racks can be nested for storage. This invention does not disclose a cabinet spine on which to rest books against. Moreover, this invention lacks support structures such as side doors with support bodies designed to support the full weight of a shelf of books.

U.S. Pat. No. 3,827,573 discloses a folding cart having a side frame with end frames hinged to the side frame and a pair of shelves hinged to the side frame. The side frame includes a pair of oppositely facing U-shaped tubular members adjacent one another and defining an opening corresponding to the distance between end frames and between the shelves. This invention does not however disclose a cabinet spine on which to rest books against. Additionally, this invention does not disclose a folding cart which is easily transported from one location to another when in a collapsed position.

U.S. Pat. No. 4,008,671 discloses a trolley with folding shelves comprising two uprights mounted on feet having castors enabling the trolley to be moved about easily, in which the shelves are each formed as a pair of half-shelves pivotable about the edge adjacent the other half-shelf of the pair, and the feet each comprise two arms which are pivotable about a vertical axis between a first position extending perpendicular to the plane defined by the two uprights and a second position extending parallel to this plane. The uprights house a connecting mechanism between the half-shelves and the arms so that when the half shelves are moved about their axes from a horizontal to a vertical position the arms are moved by the connecting mechanism from their first to their second position. This invention does not however disclose a cabinet spine on which to rest books against, and lacks sufficient support structures like side doors with support bodies designed to support the weight of a shelf full of books.

U.S. Pat. No. 4,202,278 discloses a movable distribution container that is adjustable to vary its width. The container has a frame of generally righ-tangled parallelepipedic shape that supports a plurality of juxtaposed shelves. The vertical corners of the frame are defined by vertically-extending members, pairs of which are interconnected to form the sides of the frame. The sides are adjustably interconnected to each other. This invention suffers shortcommings in that it lacks sufficient support structures like side doors with support bodies designed to support the weight of a shelf full of books. Additionally, this invention does not disclose a cabinet spine on which to rest books against.

U.S. Pat. No. 5,315,936 discloses an erectable display stand whereupon moving side panels of the display stand towards each other causes shelf supports to automatically move individual shelves from shelf-up to shelf-down positions during erection of the stand from a collapsed to an erect state. This invention does not disclose sufficient support structures like side doors with support bodies mounted to the side doors designed to support the weight of a shelf full of books. In addition, since this invention does not disclose wheels, this invention cannot be used to transport shelves full of books from one location to another.

U.S. Pat. No. 5,738,230 discloses a folding article of furniture, such as a bookcase or other storage unit, which has in its conventional aspects a vertically extending back piece, at least one vertically extending side piece secured to the back piece, and a vertically spaced plurality of shelves secured to the back piece. Each side piece is pivotable over a 90° angle relative to the back piece between a parallel or collapsed orientation and a perpendicular or use orientation, and each shelf is pivotable over a 90° angle relative to the back piece between a parallel or collapsed vertical orientation and a perpendicular or use horizontal orientation. This invention does not disclose sufficient support structures like side doors with support bodies mounted to the side doors designed to support the weight of a shelf full of books. In addition, since this invention does not disclose wheels, this invention cannot be used to transport shelves full of books from one location to another.

U.S. Pat. No. 5,765,702 discloses a wheeled display rack comprising a back panel, two side panels connected to the edges of the back panel, a plurality of removable shelves and a wheeled support including rotatable wheels. The wheeled support is movable between an active position in which the display rack may be supported by the wheeled support and an interactive position in which the display rack may not be supported by the wheeled support. This invention does not disclose shelves pivotally mounted onto a cabinet spine which are movable between a first position generally perpendicular with respect to the cabinet spine and a second position generally parallel with respect to the cabinet spine.

U.S. Pat. No. 5,806,864 discloses a foldable or collapsible utility cart which may be alternated between a closed and an open, operable position. This invention further discloses four vertical legs with a plurality of shelves mounted thereon. The shelves are rotatable relative to the legs and foldable about a middle thereof so that the cart may be alternated between the open operable position and the closed position for storage purposes. This invention does not disclose a cabinet spine on which to rest books against.

It is apparent from the conventional collapsible carts that there is a need for a collapsible cart for transporting books, files and other items that is durable and rugged; that can support a large amount of weight; that is movable between a collapsed position, for transporting the collapsible cart from one location to another, and a transport position, for transporting books, files and other items; and that occupies significantly less area in the collapsed position than in the transport position.

SUMMARY OF THE INVENTION

It is one feature and advantage of this invention to provide a collapsible cart for transporting books, files and other items which is durable and rugged.

It is another feature and advantage of this invention to provide a collapsible cart for transporting books, files and other items which can support a large amount of weight.

It is another feature and advantage of this invention to provide a collapsible cart for transporting books, files and other items that is movable between a collapsed position, for transporting the collapsible cart from one location to another, and a transport position, for transporting books, files and other items.

It is yet another feature and advantage of this invention to provide a collapsible cart for transporting books, files and other items that occupies significantly less area in the collapsed position than in the transport position.

The above and other features and advantages of this invention are accomplished with a collapsible cart that has a cabinet spine, a collapsible shelf, and wheels. In one embodiment according to this invention, a collapsible cart for transporting books, files, and other items has a cabinet spine, a first collapsible shelf, a first fastener, and a plurality of wheels. The cabinet spine has a first surface whereupon the first collapsible shelf is pivotally mounted. The first collapsible shelf is movable between a first position generally perpendicular with respect to the cabinet spine and a second position generally parallel with respect to the cabinet spine. The first fastener is attached to the cabinet spine and is coupled with respect to the first collapsible shelf when in the second position. The plurality of wheels are mounted underneath the collapsible cart and allow the cart to be transported from one location to another location.

In another embodiment of this invention, a second collapsible shelf is pivotally mounted onto the first surface and movable between the first and second positions. A first connecting arm is fastened to the first collapsible shelf and the second collapsible shelf, so that a user may simultaneously move the first and second collapsible shelves from the first position to the second position. A pair of first connecting arms may also be used, one on each side of the first and second collapsible shelves.

In yet another embodiment of this invention, a first door is pivotally mounted to one side of the cabinet spine. A second door is pivotally mounted to another side of the cabinet spine opposed to the first door. While the shelves are mounted in a generally horizontal position, the first and second doors are mounted in a generally vertical direction.

The collapsible cart is placed in a collapsed position by moving the first collapsible shelf to the second position, and the first and second doors to the closed position. By placing the collapsible cart in the collapsed position, a user can decrease the amount of area the collapsible cart occupies. The collapsed position is particularly useful when transporting one or more collapsible cart from one location to another, since more collapsible carts can be placed in the transport vehicle.

The collapsible cart can be placed in a transport position by moving the first collapsible shelf to the first position, and the first and second doors to the open position. By placing the collapsible cart in the transport position, a user can use the collapsible cart to transport books, files, and other items from one location to another.

In another embodiment of this invention, a third collapsible shelf and a fourth collapsible shelf are pivotally mounted onto a second surface of the cabinet spine, opposed to the first surface. The third and fourth collapsible shelves are movable between the first and second positions. A second connecting arm is fastened to the third and fourth collapsible shelves, so that a user may simultaneously move both the third and fourth collapsible shelves from the first position to the second position. A pair of second connecting arms may be used, one on each side of the third and fourth collapsible shelves. A second fastener is attached to the cabinet spine and is coupled with respect to the third collapsible shelf when in the second position.

In yet another embodiment of this invention, a third door is pivotally mounted to one side of the cabinet spine. A fourth door is pivotally mounted to another side of the cabinet spine opposed to the third door. While the shelves are mounted in a generally horizontal position, the third and fourth doors are mounted in a generally vertical direction.

In another embodiment of this invention, the plurality of wheels are mounted underneath at least one of the first door, the second door, the third door, the fourth door, or the cabinet spine to more easily move the collapsible cart from one location to another. Preferably, one wheel is mounted underneath each of the first door, the second door, the third door, and the fourth door.

In yet another embodiment of this invention, the first, second, third, and fourth doors have an inside surfaces which face the cabinet spine. Support bodies are attached to at least one of the first and second doors, and at least one of the third and fourth doors in order to support the collapsible shelves.

BRIEF DESCRIPTION OF THE DRAWINGS

The above-mentioned and other features and objects of this invention will be better understood from the following detailed description taken in conjunction with the drawings wherein:

FIG. 2 is a side cross sectional view of a collapsible cart in the transport position as shown in FIG. 1, according to one embodiment of this invention;

FIG. 3 is a side view of a collapsible cart in the transport position according to one embodiment of this invention;

FIG. 4 is a side cross sectional view of a collapsible cart in the collapsed position as shown in FIG. 5, according to one embodiment of this invention;

FIG. 5 is a front view of a collapsible cart in the collapsed position according to one embodiment of this invention;

DETAILED DESCRIPTION OF PRESENTLY PREFERRED EMBODIMENTS

Figure 1:
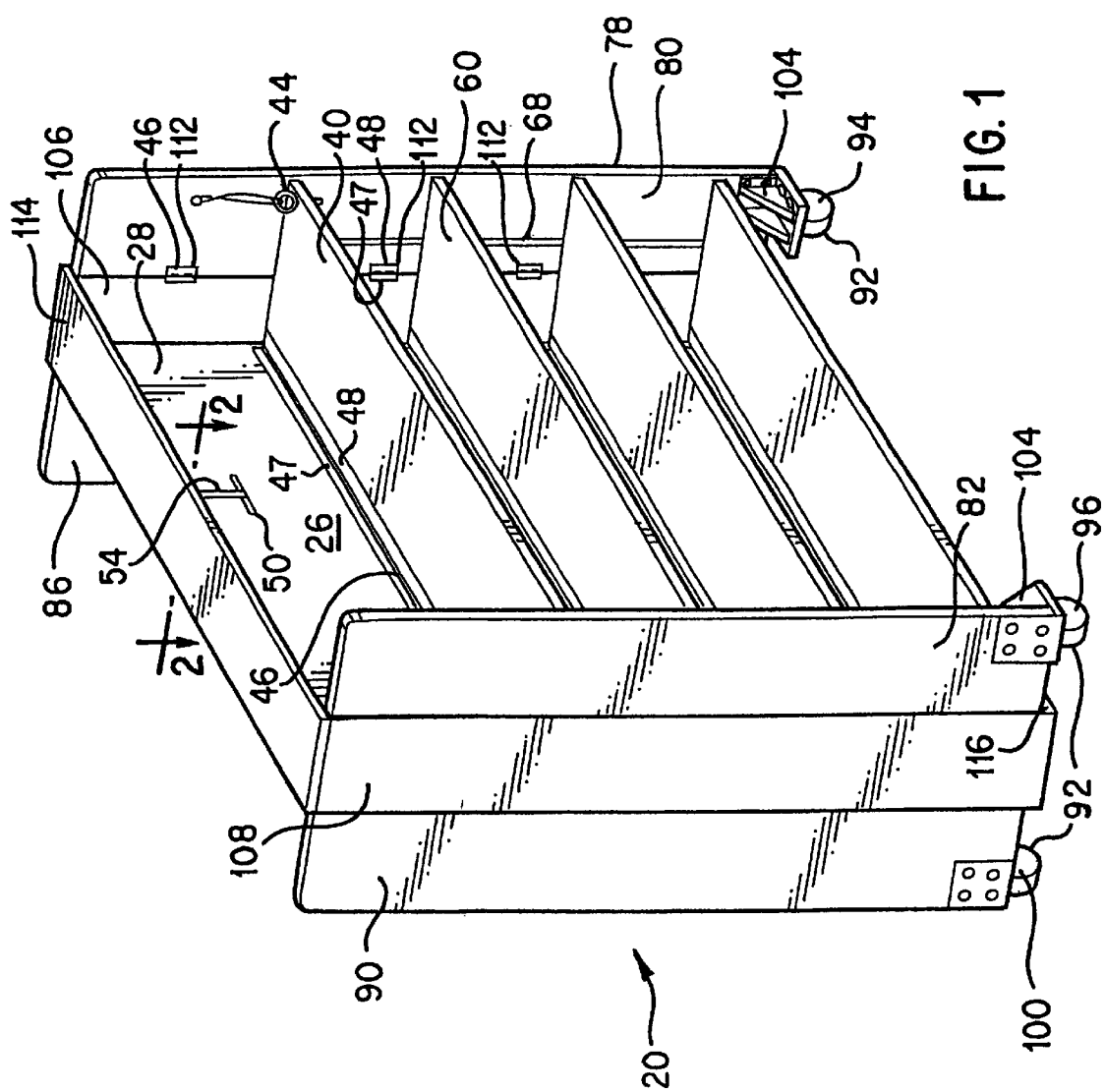
FIG. 1 is a perspective view of a collapsible cart in the transport position according to one embodiment of this invention.

FIG. 1 shows collapsible cart 20 for transporting books, files, and other items, according to one preferred embodiment of this invention. Collapsible cart 20 comprises cabinet spine 26, first collapsible shelf 40, first fastener 50, and a plurality of wheels 92. Cabinet spine 26 comprises first surface 28. Cabinet spine 26 serves as a backing upon which to rests books, files and other items which are transported from one location to another location in collapsible cart 20. Additionally, cabinet spine 26 serves as a support structure which support shelves, such as first collapsible shelf 40, books, and other items which are placed on first collapsible shelf 40. As a support structure, cabinet spine 26 is constructed from rigid material, like steel, aluminum, fiberglass, plastic, or wood, which can be used to support collapsible shelves and items placed on the collapsible shelves. In one preferred embodiment of this invention, cabinet spine 26 is made from wood, since wood is easy to handle, costs less most other materials, and is easily malleable. As a backing upon which to rests books, files and other items, cabinet spine 26 is manufactured from a solid, flat sheet of material, a wire mesh, or any other combination of materials and shapes which can support a shelve and serve as a backing for items placed on the shelves.

First collapsible shelf 40 is pivotally mounted onto first surface 28 of cabinet spine 26. First collapsible shelf 40 is movable between a first position generally perpendicular with respect to cabinet spine 26 and a second position generally parallel with respect to cabinet spine 26. In one preferred embodiment of this invention, first collapsible shelf 40 is pivotally mounted onto first surface 28 by using pivot mount 46 having first joint 47 and second joint 48. Preferably, pivot mount 46 comprises a continuous hinge which runs across the length between first collapsible shelf 40 and cabinet spine 26. However, pivot mount 46 may comprise a pin attached at each end of first collapsible shelf 40 and into cabinet spine 26, which allows first collapsible shelf 40 to be movable between a first and second position.

Figure 6:
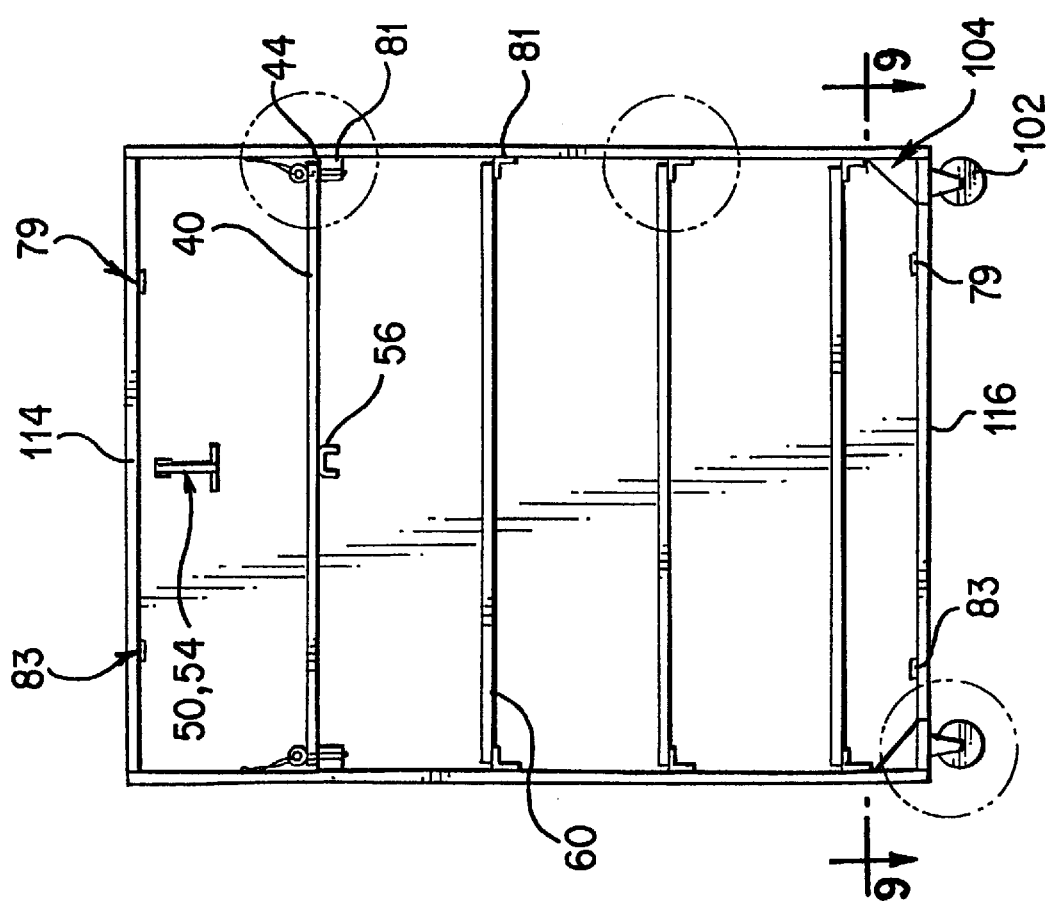
FIG. 6 is a front view of a collapsible cart in the transport position according to one embodiment of this invention.

First fastener 50 is attached to cabinet spine 26 and is coupled with respect to first collapsible shelf 40 when first collapsible shelf 40 is in the second position. In one preferred embodiment of this invention, first fastener 50 comprises retaining tee 54 which couples to latch 56, a U-shaped member, as shown in FIGS. 5–6. When first collapsible shelf 40 is moved to the second position, retaining tee 54 swings downward and is coupled with latch 56, thus retaining collapsible shelf 40 in the second position. While it is to use retaining tee 54 and latch 56, other suitable devices may be coupled with respect to first collapsible shelf 40 to retain first collapsible shelf in the second position. For example, a pair of magnets mounted onto first surface 28 and first collapsible shelf 40, or even a hook and a loop may be used to retain collapsible shelf 40 in the second position.

Figure 10:
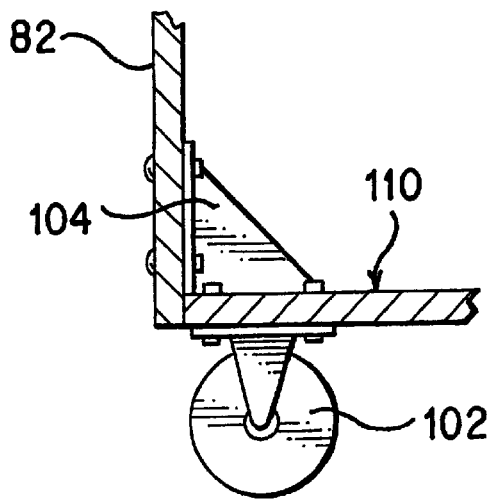
FIG. 10 is yet another enlarged sectional view of the collapsible cart shown in FIG. 6, according to one embodiment of this invention.

A plurality of wheels 92 are mounted underneath collapsible cart 20 so that collapsible 20 may be transported form one location to another location. Preferably, wheels 92 are of the type commonly known as castors 102, as shown in FIG. 10. However, any type of wheel which is generally round in shape and can be mounted may be used for wheel 92. In one preferred embodiment, wheels 92 are castors 102 mounted underneath collapsible cart 20 and support by corner struts 104 and cabinet base 110. While in this embodiment, castors 102 are rotatable about an axis, and allow collapsible cart 20 to be easily pushed in any direction, castors 102 may be fixed and not rotatable about an axis.

Figure 9:
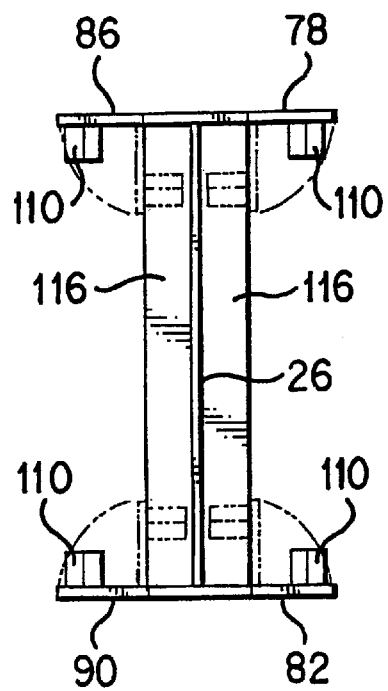
FIG. 9 is a top cross sectional view of a collapsible cart in the transport position as shown in FIG. 6, according to one embodiment of this invention.

Corner struts 104 are made from a rigid material, like steel, aluminum or wood. In one preferred embodiment of this invention, corner struts 104 are made from steel. In one preferred embodiment of this invention, wheels 92 are mounted directly onto cabinet base 110, as shown in FIG. 10. Cabinet base 110 is made from a rigid material, like steel, aluminum, wood or rigid plastic. Cabinet base 110 is attached to at least one of first door 78, second door 82, third door 86, and fourth door 90 as shown in FIG. 9.

Preferably wheels 92 are spaced out so that collapsible cart is evenly supported by and balanced onto wheels 92. In one preferred embodiment of this invention, wheels 92 may be mounted underneath and along cabinet spine 26. However, mounting wheels 92 along cabinet spine 26 would require a user to tilt cabinet spine 26 in order to move cabinet spine 26 from one location to another. Preferably, at least one addition support member is attached to cabinet spine 26. This additional support member projects outwards and away from cabinet spine 26 to create a wide base of support for collapsible cart 20. At one end the additional support member is attached to cabinet spine 26, while at the other end the additional support member is attached to a wheel 92.

Collapsible cart 20 is movable between a collapsed position, for transporting collapsible cart 20 from one location to another, and a transport position, for transporting books, files and other items. The user may move collapsible cart 20 to the collapsed position by moving first collapsible shelf 40 from the first position to the second position and coupling first collapsible shelf 40 with respect to the first fastener 50, as shown in FIGS. 4–5. In the collapsed position, collapsible cart 20 occupies much less space and therefore can more easily be transported from one location to another. Additionally, the collapsed position allows more collapsible carts 20 to fit in a given space, and therefore more collapsible carts 20 can be transported from one area to another than the transport position. For example, when transporting a number of collapsible carts 20 to a job site using a truck, at least twice as many collapsible carts 20 may be fitted onto the truck. Once collapsible carts 20 arrive at the job site, they can be moved from the collapsed position to the transport position by unfastening first collapsible shelf 40 from first fastener 50, and moving first collapsible shelf 40 from the second position to the first position, allowing books, files and other items to be placed onto first collapsible shelf 40, as shown in FIGS. 2–3.

In one preferred embodiment of this invention, second collapsible shelf 60 is pivotally mounted to first surface 28 of cabinet spine 26. As shown in FIG. 2, second collapsible shelf 60 is movable between a first position generally perpendicular with respect to cabinet spine 26 and a second position generally parallel with respect to cabinet spine 26. First connecting arm 68 is fastened to first collapsible shelf 40 and to second collapsible shelf 60, so that when first collapsible shelf 40 is moved from the first position to the second position, second collapsible shelf 60 is also moved from the first position to the second position. By fastening first connecting arm 68 to first collapsible shelf 40 and second collapsible shelf 60, a user can raise both first collapsible shelf 40 and second collapsible shelf 60 simultaneously. By allowing all of the collapsible shelves mounted to the second surface 30 to be raised simultaneously, the transformation of collapsible cart 20 from a collapsed position, for transporting collapsible cart 20 from one location to another, to a transport position, for transporting books, files and other items, is made easier.

While in this preferred embodiment only two collapsible shelves are pivotally mounted to first surface 28, additional collapsible shelves may be pivotally mounted to first surface 28, as shown in FIG. 2. The additional collapsible shelves pivotally mounted to first surface 28 may all be connected to first connecting arm 68 so that all the collapsible shelves mounted to first surface 28 may be placed in the first or second position simultaneously.

While in this preferred embodiment only one connecting arm 68 is used, additional connecting arms 68 may be fastened to any or all of the collapsible shelves. For example, one connecting arm 68 may be fastened to each side of first collapsible shelf 40 and second collapsible shelf 60 in order to provide additional support when raising first and second collapsible shelves 40, 60 and placing collapsible cart 20 in the collapsed position.

In one preferred embodiment of this invention, first door 78 is pivotally mounted to cabinet spine 26. As shown in FIG. 9, first door 78 is movable between an open position generally perpendicular with respect to first surface 28 and a closed position generally parallel with respect to first surface 28. Second door 82 is pivotally mounted to cabinet spine 26 and opposed to first door 78. Second door 82 is also movable between an open position generally perpendicular with respect to first surface 28 and a closed position generally parallel with respect to first surface 28. In this embodiment, a user may move collapsible cart 20 to the collapsed position by moving first collapsible shelf 40 from the first position to the second position and coupling first collapsible shelf 40 with respect to first fastener 50. Additionally, the user must then move first door 78 and second door 82 from an open to a closed position. A first door fastener 79 may be placed on cabinet spine 26 and first door 78 so that first door 78 may be coupled with respect to cabinet spine 26 in the closed position. Similarly, a second door fastener 83 may be placed on cabinet spine 26 and second door 82 so that second door 82 may be coupled with respect to cabinet spine 26 in the closed position. In one preferred embodiment of this invention, first door 78 and second door 82 are used as support members and are coupled with respect to a plurality of wheels 92 mounted underneath first door 78, second door 82, and cabinet spine 26, as shown in FIGS. 1–2. A first wheel 94 is mounted underneath first door 78, a second wheel 96 is mounted underneath second door 82, and a wheel 97 is mounted underneath the cabinet spine 26.

In one preferred embodiment of this invention, first door 78 comprises inside surface 80 and support body 81, wherein inside surface 80 faces cabinet spine 26 when first door 78 is in the closed position, and support body 81 is attached to inside surface 80 of first door 78 and positioned underneath first collapsible shelf 40, as shown in FIG. 6. Support body 81 is designed to support the weight of a shelf, such as first collapsible shelf 40, along with any books, files or other items placed on the shelf. In one preferred embodiment of this invention, an additional support body 81 is attached to inside surface 80 of second door 82, wherein inside surface 80 of second door 82 faces cabinet spine 26 when second door 78 is in the closed position, as shown in FIG. 6. The additional support body 81 attached to inside surface 80 of second door 82 is positioned underneath first collapsible shelf 40 to provide additional support. Support body 81 may be, but is not limited to, a bracket or step mounted onto inside surfaces 80 of first door 78 and second door 82. Support bodies 81 provide the additional support required to support a shelf, such as first collapsible shelf 40, filled with books, files or other items.

In one preferred embodiment of this invention, cabinet spine 26 further comprises second surface 30 opposed to first surface 28. Additional shelves may be mounted onto second surface 30, as shown in FIG. 2. In one preferred embodiment of this invention, third collapsible shelf 62 is pivotally mounted to second surface 30 of cabinet spine 26, wherein third collapsible shelf 62 is movable between a first position generally perpendicular with respect to cabinet spine 26 and a second position generally parallel with respect to cabinet spine 26. Second fastener 52 is attached to cabinet spine 26 so that third collapsible shelf 62 is coupled with respect to second fastener 52 when in the second position.

In one preferred embodiment of this invention, fourth collapsible shelf 64 is pivotally mounted to second surface 30 of cabinet spine 26. As shown in FIG. 2, fourth collapsible shelf 64 is movable between a first position generally perpendicular with respect to cabinet spine 26 and a second position generally parallel with respect to cabinet spine 26. Second connecting arm 72 is fastened to third collapsible shelf 62 and to fourth collapsible shelf 64, so that when third collapsible shelf 62 is moved from the first position to the second position, fourth collapsible shelf 64 is also moved from the first position to the second position. By fastening a second connecting arm to third collapsible shelf 62 and fourth collapsible shelf 64, a user can raise both third collapsible shelf 62 and fourth collapsible shelf 64 simultaneously, and transform collapsible cart 20 from a collapsed position to a transport position. While in this embodiment only two collapsible shelves are pivotally mounted to second surface 30, additional collapsible shelves may be pivotally mounted to second surface 30, as shown in FIG. 2. The additional collapsible shelves pivotally mounted to second surface 30 may all be connected to second connecting arm 72 so that all the collapsible shelves mounted to second surface 30 may be placed in the first or second position simultaneously.

The collapsible shelves are constructed from rigid material, like steel aluminum, fiberglass, plastic or wood, since the collapsible shelves need to support a heavy loads, like a shelf full of books. In one preferred embodiment of this invention, the collapsible shelves are made of wood since wood is easily malleable. In one preferred embodiment of this invention, the collapsible shelves are mounted in a generally horizontal position, parallel with the ground.

In one preferred embodiment of this invention, third door 86 and fourth door 90 are pivotally mounted to cabinet spine 26, in much the same manner as first door 78 and second door 82, as shown in FIG. 9. Third door 86 and four door 90 are movable between an open position generally perpendicular with respect to second surface 30 and a closed position generally parallel with respect to second surface 30. Fourth door 90 is pivotally mounted to cabinet spine 26 and opposed to third door 86. In this embodiment, a user may move collapsible cart 20 to the collapsed position by moving first collapsible shelf 40 and third collapsible shelf 62 from the first position to the second position and coupling first collapsible shelf 40 with respect to first fastener 50 and third collapsible shelf 62 with respect to second fastener 52. Additionally, the user must then move first door 78, second door 82, third door 86, and fourth door 90 from an open to a closed position.

In one preferred embodiment of this invention, a third door fastener 87 is placed on cabinet spine 26 and third door 86 so that third door 86 may be coupled with respect to cabinet spine 26 in the closed position, as shown in FIG. 2. Similarly, a fourth door fastener (not shown) is placed on cabinet spine 26 and fourth door 90 so that fourth door 90 may be coupled with respect to cabinet spine 26 in the closed position. In one preferred embodiment of this invention, third door 86 and fourth door 90 are used as support member and are coupled with respect to wheels 92 mounted underneath first door 78, second door 82, third door 86, and fourth door 90. First door 78 is coupled with first wheel 94, second door 82 is coupled with second wheel 96, third door 86 is coupled with a third wheel (not shown), and fourth door 90 is coupled with fourth wheel 100, as shown in FIG. 1. While in the above preferred embodiments only one door fastener is used per door 78, 82, 86, 90, additional door fasteners may be used. For example, two first door fasteners 79 and two second door fasteners 83 may be used to couple first door 78 and second door 82 with respect to cabinet spine 26, as shown in FIG. 6.

In one preferred embodiment of this invention, third door 86 comprises inside surface 80 and support body 81, wherein inside surface 80 faces cabinet spine 26 when third door 86 is in the closed position, and support body 81 is attached to inside surface 80 of third door 86 and positioned underneath third collapsible shelf 62. In one preferred embodiment of this invention, an additional support body 81 is attached to inside surface 80 of fourth door 90, wherein inside surface 80 of fourth door 90 faces cabinet spine 26 when fourth door 90 is in the closed position. The additional support body 81 attached to inside surface 80 of fourth door 90 is positioned underneath third collapsible shelf 62 to provide additional support. While support bodies 81 are described only to support first collapsible shelf 40 and third collapsible shelf 62, support bodies 81 may be added to inside surfaces 80 of first door 78, second door 82, third door 86, and fourth door 90 to support any number of collapsible shelves mounted onto first surface 28 or second surface 30 of cabinet spine 26.

In one preferred embodiment of this invention first spine extension 106 is mounted at one end of cabinet spine 26, generally perpendicular to cabinet spine 26, and second spine extension 108 is mounted at another end of cabinet spine 26, generally perpendicular to cabinet spine 26 and opposed to first spine extension 106, as shown in FIG. 1. Spine extensions 106, 108 are designed to support the weight of first door 78, second door 82, third door 86, and fourth door 90. Since spine extensions 106, 108 are used to provide additional support, they are made from the same rigid materials as cabinet spine 26. In one preferred embodiment of this invention, spine extensions 106, 108 are made from wood. In addition to supporting the weight of first door 78, second door 82, third door 86, and fourth door 90, spine extensions 106, 108 provide additional structural support for collapsible cart 20. First door 78 is pivotally mounted to one end of first spine extension 106. Additionally, third door 86 is mounted to another end of first spine extension 106, opposed to first door 78. Second door 82 is pivotally mounted to one end of second spine extension 108. Fourth door 90 is mounted to another end of second spine extension 108, opposed to second door 82.

In one preferred embodiment of this invention third spine extension 114 is mounted at the top of cabinet spine 26, generally perpendicular to cabinet spine 26, and fourth spine extension 116 is mounted at the bottom of cabinet spine 26, generally perpendicular to cabinet spine 26 and opposed to third spine extension 114, as shown in FIGS. 1 and 6. Spine extensions 114, 116 are designed to provide additional structural support to collapsible cart 20. Since spine extensions 114, 116 are used to provide additional support, they are made from the same rigid materials as cabinet spine 26. However, spine extensions 114, 116 can be made from any rigid material such as steel, aluminum, or wood.

Figure 11:
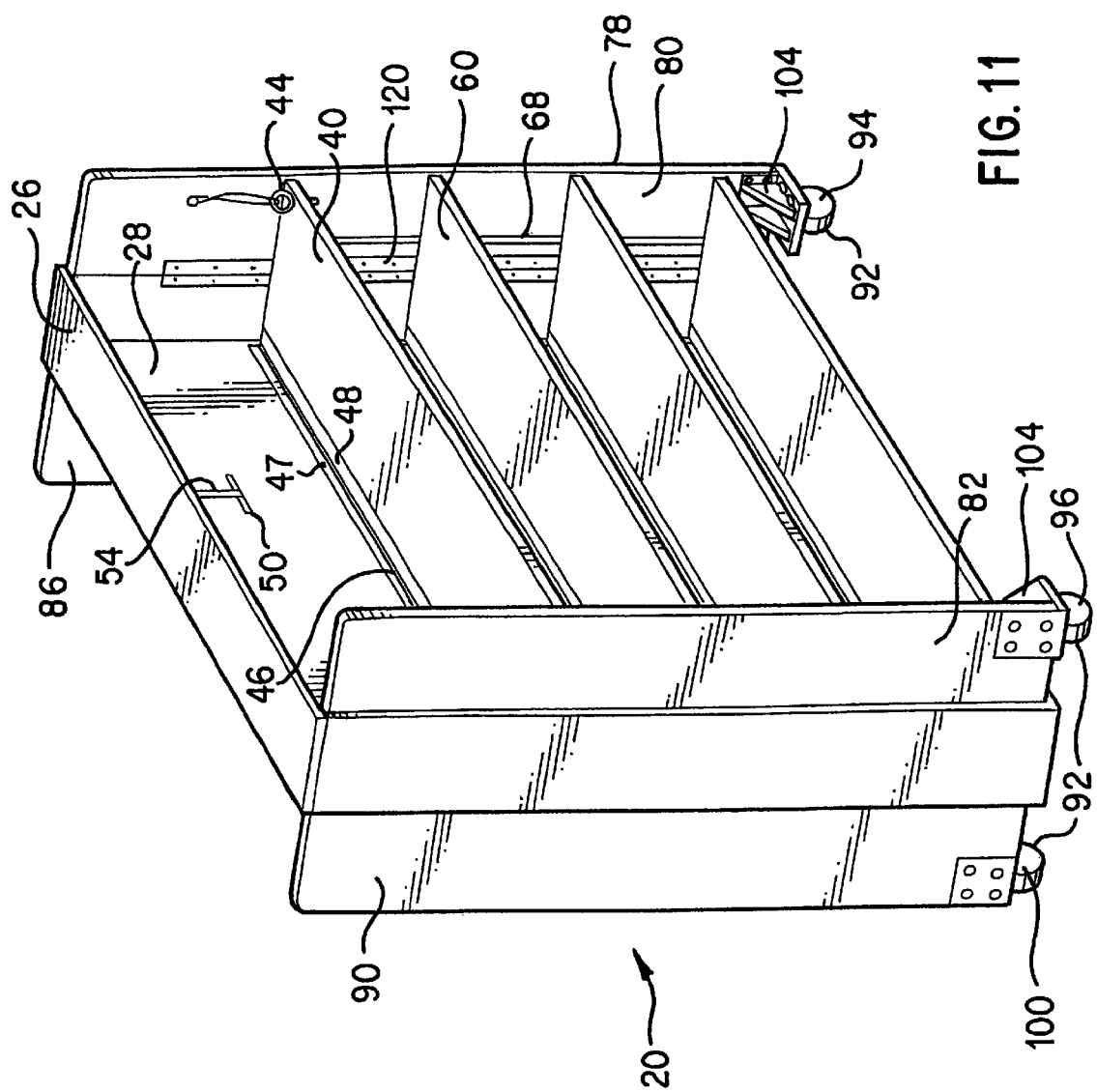
FIG. 11 is a perspective view of a collapsible cart in the transport position according to one embodiment of the invention.

In one preferred embodiment of this invention, first, second, third, and fourth door 78, 82, 86, 90 are pivotally mounted to cabinet spine 26 or spine extensions 106, 108 by using pivot mount 46 having first joint 47 and second joint 48, as shown in FIG. 1. Preferably, pivot mount 46 comprises continuous hinge 120 which runs across the length between the first, second, third, or fourth door 78, 82, 86, 90 and cabinet spine 26 or spine extensions 106, 108, as shown in FIG. 11. However, pivot mount 46 may comprise a pin attached at each end of first, second, third, or fourth door 78, 82, 86, 90 and into cabinet spine 26 or spine extensions 106, 108, which allows first, second, third, or fourth door 78, 82, 86, 90 to be movable between a first and second position. Pivot mount 46 may also comprise a series of hinges 112, as shown in FIG. 1.

Figure 7:
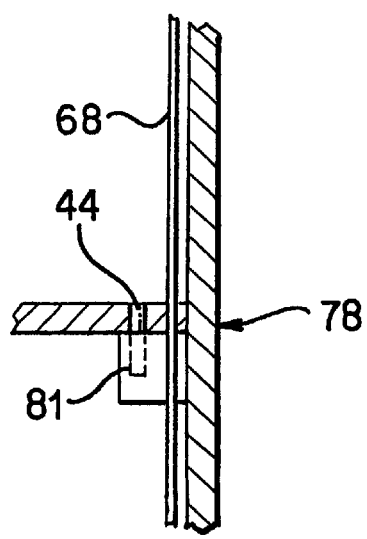
FIG. 7 is an enlarged sectional view of the collapsible cart shown in FIG. 6, according to one embodiment of this invention.
Figure 8:
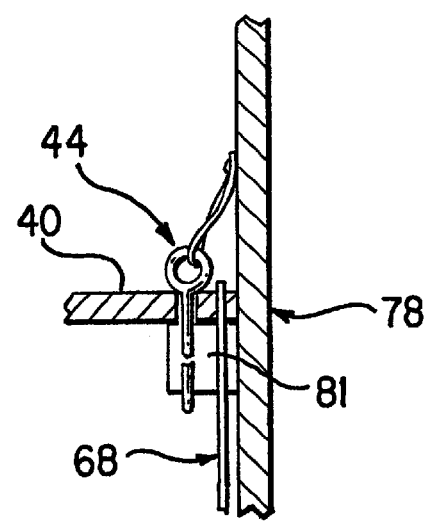
FIG. 8 is another enlarged sectional view of the collapsible cart shown in FIG. 6, according to one embodiment of this invention.

In one preferred embodiment of this invention, first, second, third, or fourth door 78, 82, 86, 90 are held in place by retaining pin 44, as shown in FIGS. 6–8. Retaining pin 44 goes through a collapsible shelf and into or through a support body 81. In this way, retaining pin 44 prevents first, second, third, or fourth door 78, 82, 86, 90 from moving while collapsible cart 20 is in the transport position.

FIGS. 12–17 illustrate yet another embodiment of the invention which is useful when the collapsible cart is fabricated from a high-strength polymer composite instead of wood or metal. The embodiment of FIGS. 12–17 is also modular, in that individual book shelves, doors and wheels can be removed and replaced without requiring tools or significant effort. Several of the features shown in FIGS. 12–17 may also be included in the embodiments previously described.

Figure 12:
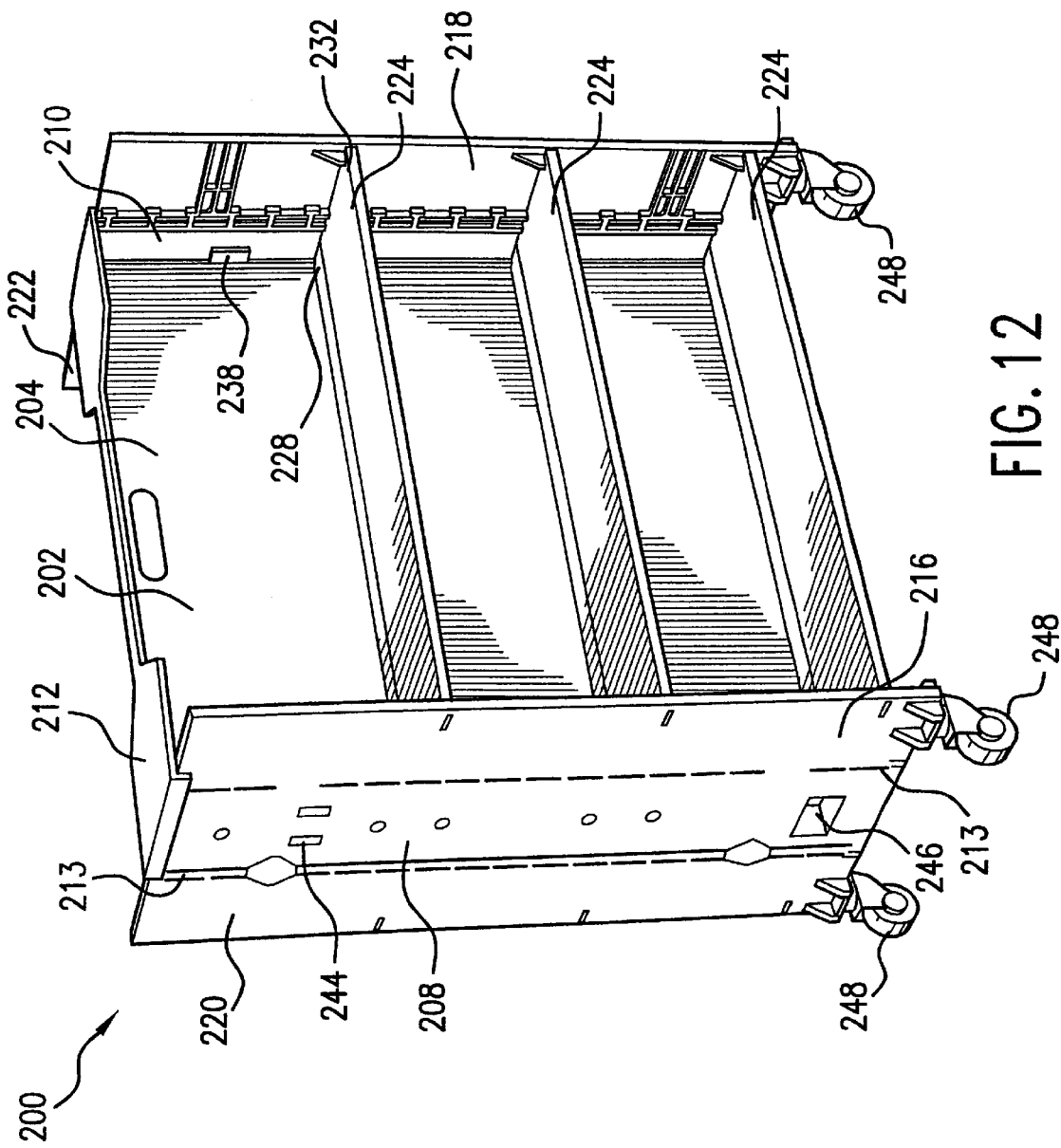
FIG. 12 is a perspective view of another embodiment of the collapsible cart of the invention.
Figure 13:
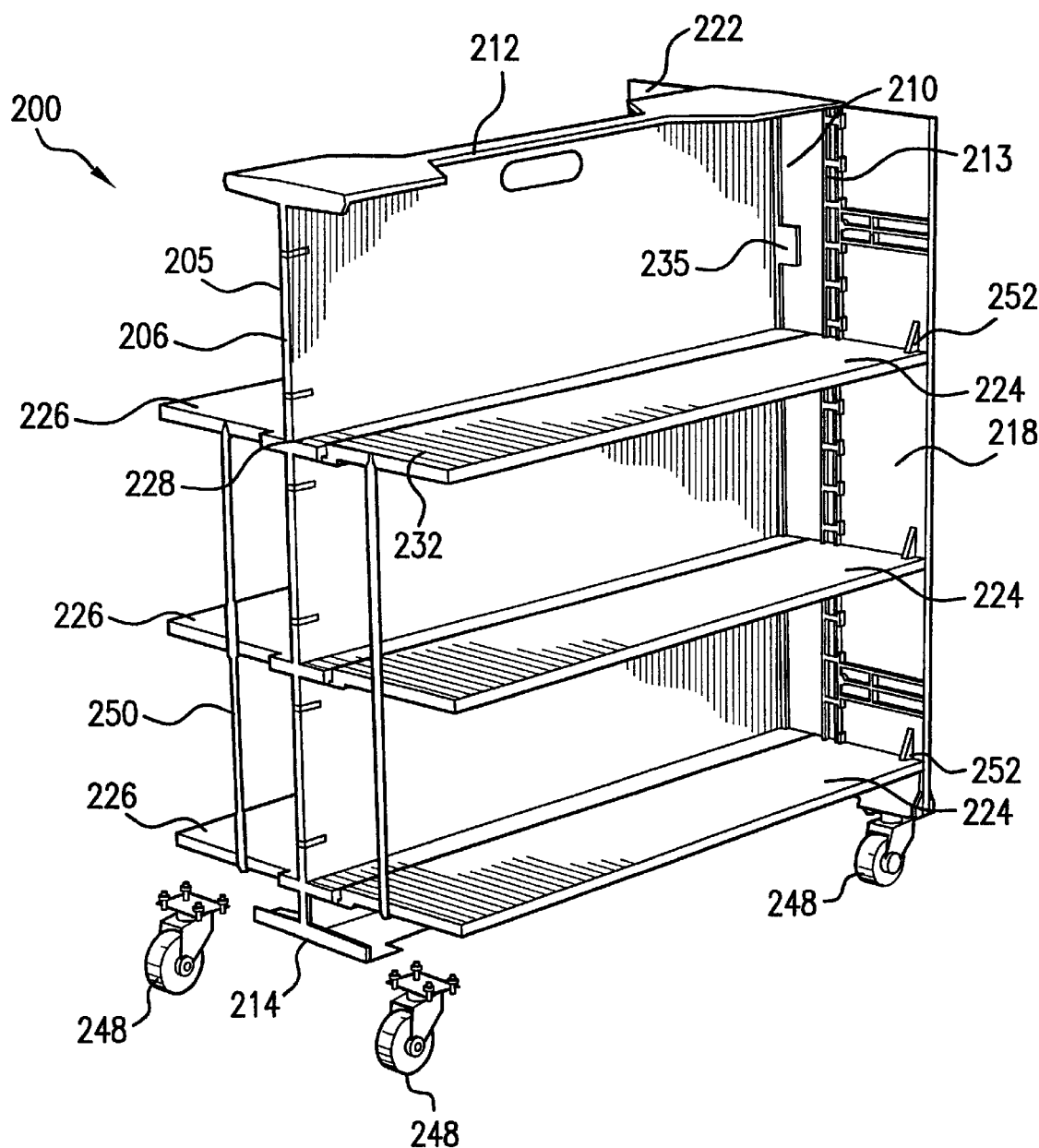
FIG. 13 is a perspective view of the collapsible cart of FIG. 12, with two of the doors and one of the spine extensions removed.
Figure 14:
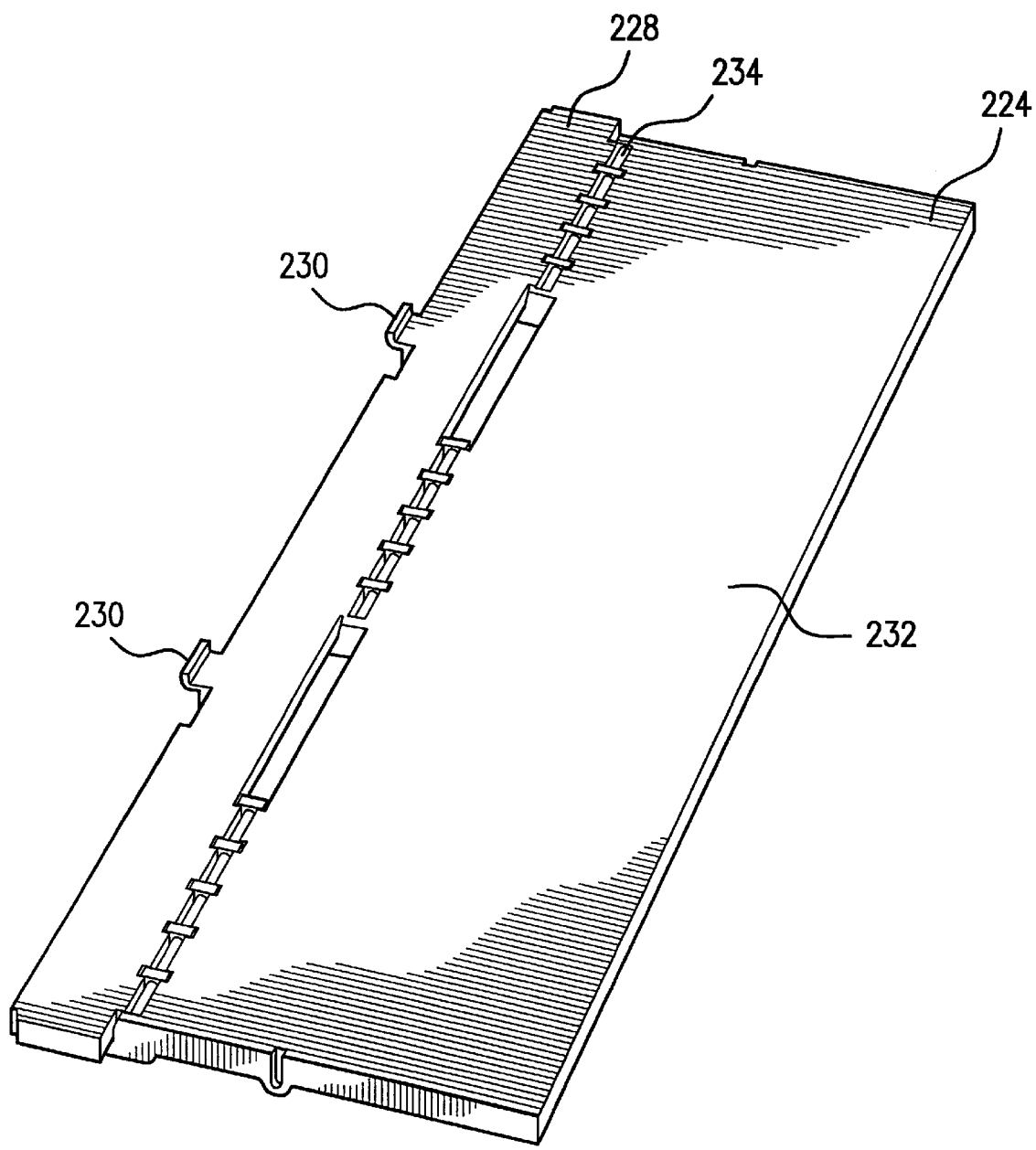
FIG. 14 is a top perspective view of a single collapsible shelf compatible with the collapsible cart of FIG. 12.

Referring first to FIGS. 12 and 13, collapsible cart 200 includes a cabinet spine 202 having a first surface 204, a second opposing surface 205 (not visible), a first side edge 206, a second side edge, a top edge and a bottom edge. A first spine extension 208 is mounted generally perpendicular to the cabinet spine along the first side edge of the cabinet spine. A second spine extension 210 is mounted generally perpendicular to the cabinet spine along the second side edge of the cabinet spine. A third spine extension 212 is mounted generally perpendicular to the cabinet spine along the top end edge of the cabinet spine. A fourth spine extension 214 is mounted generally perpendicular to the cabinet spine along the bottom end edge of the cabinet spine. Some or all of the spine extensions may be integral with the cabinet spine, i.e., may be molded or otherwise formed along with the cabinet spine as a single piece. Alternatively, the spine extensions may be molded or formed separately and connected to the cabinet spine.

A first door 216 is pivotally mounted adjacent to the first spine extension 208, and is movable between an open position generally perpendicular to the first surface 204 of the cabinet spine 202, and a closed position generally parallel to the first surface 204. A second door 218 is pivotally mounted adjacent to the second spine extension 210, and is movable between an open position generally perpendicular to the first surface 204 and a closed position generally parallel to the first surface 204. A third door 220 is pivotally mounted adjacent to the first spine extension 208, and is movable between an open position generally perpendicular to the second surface 205 of the cabinet spine 202, and a closed position generally parallel to the second surface of the cabinet spine 202. A fourth door 222 is pivotally mounted adjacent to the second spine extension 210, and is movable between an open position generally perpendicular to the second surface of the cabinet spine 202, and a closed position generally parallel to the second surface 205 of the cabinet spine 202. The doors may be maintained in their open positions using safety plates 245 mounted between the doors and the respective first or second spine extension on the outside, and the open shelves on the inside.

A first plurality of collapsible shelves 224 is mounted to the first surface 204 of the cabinet spine 202, the mounting occurring between the first and second spine extensions 208 and 210. A second plurality of collapsible shelves 226 is mounted to the second surface 205 of the cabinet spine 202, the mounting occurring between the first and second spine extensions 208 and 210. As shown more clearly in FIGS. 14–17, each of the shelves 224 and 226 has a first narrower portion 228 which is directly mounted to the cabinet spine 202 using mounting tabs 230 which are inserted into corresponding openings in the cabinet spine 202. The first narrower portion 228 of each shelf has a fixed position in the collapsible cart 200, and does not rotate or pivot. Each shelf 224 and 226 also has a second wider portion 232 which is pivotally mounted to the first narrower portion 228 via a plurality of integral pivot hinges 234. The second portion 232 is movable between an open position extending from the cabinet spine 202, and a closed portion generally parallel to the cabinet spine 202. When in the open position, the wider portion 232 may be generally perpendicular to the cabinet spine 202, or may be tilted upward at a slight angle (suitably 1–10 degrees above perpendicular, desirably 3–5 degrees above perpendicular) to prevent the contents of the shelf 224, 226 from spilling during moving and transportation of the collapsible cart 200. The tilting of the wider portion 232 may result from the narrower portion 228 also being tilted upward at the same angle.

As shown in FIGS. 12 and 13, the narrower portion 228 of each shelf 224, 226 should be narrow enough that the hinges 234 which join the shelf portions are disposed between the first and second spine extensions 208 and 210, and inward (i.e., closer to the spine 202) from the door hinges 213 which join each of the doors 216, 218, 220 and 222 to the corresponding spine extension. This way, when the wider portions 232 of the shelves are rotated to their closed, upright positions via the pivot hinges 234, the doors may also be rotated to their closed positions via the door hinges 213. Desirably, the wider shelf portions should rotate upward to a position which is generally parallel (i.e., ranging from parallel to being tilted inward slightly) with respect to the cabinet spine 204. The upward, inward rotation of the wider shelf portions 232 may be limited by stops 238 which are mounted on an inner surface of the first and/or second spine extensions 208 and 210. The stops may also be associated with latches or other catching mechanisms which prevent the closed shelves from randomly opening.

Figure 15:
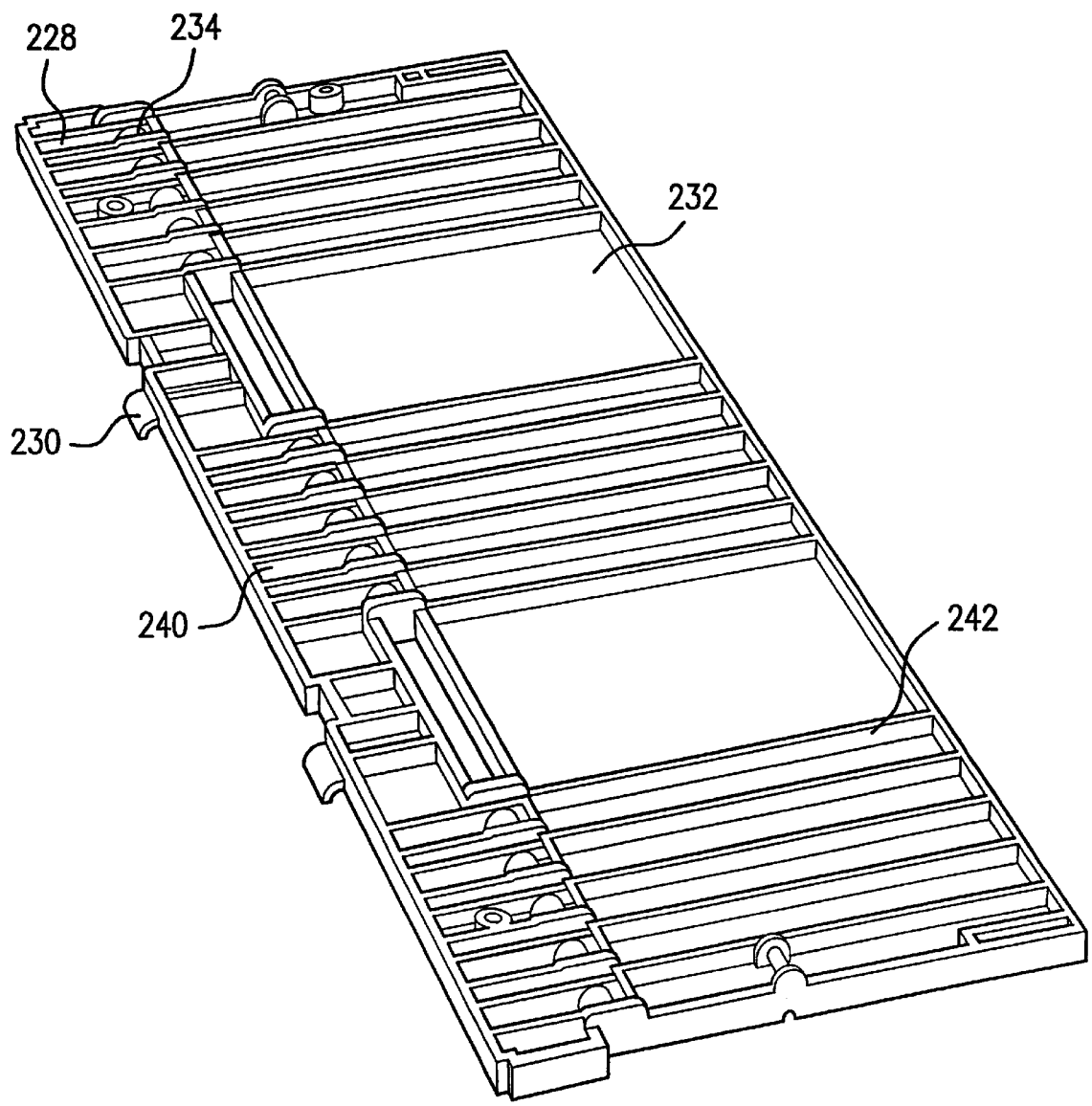
FIG. 15 is a bottom perspective view of the collapsible shelf of FIG. 14.

As shown in FIG. 15, each narrower shelf portion 228 may have a ribbed lower surface 240, and each wider shelf portion 232 may have a ribbed lower surface 242. The ribbed lower surfaces 240 and 242 provide added structural integrity to the shelf components while minimizing weight. This feature is especially useful when the shelf components are formed by molding a high strength polymer or polymer composite such as polypropylene, filled polypropylene or the like.

Figure 16:
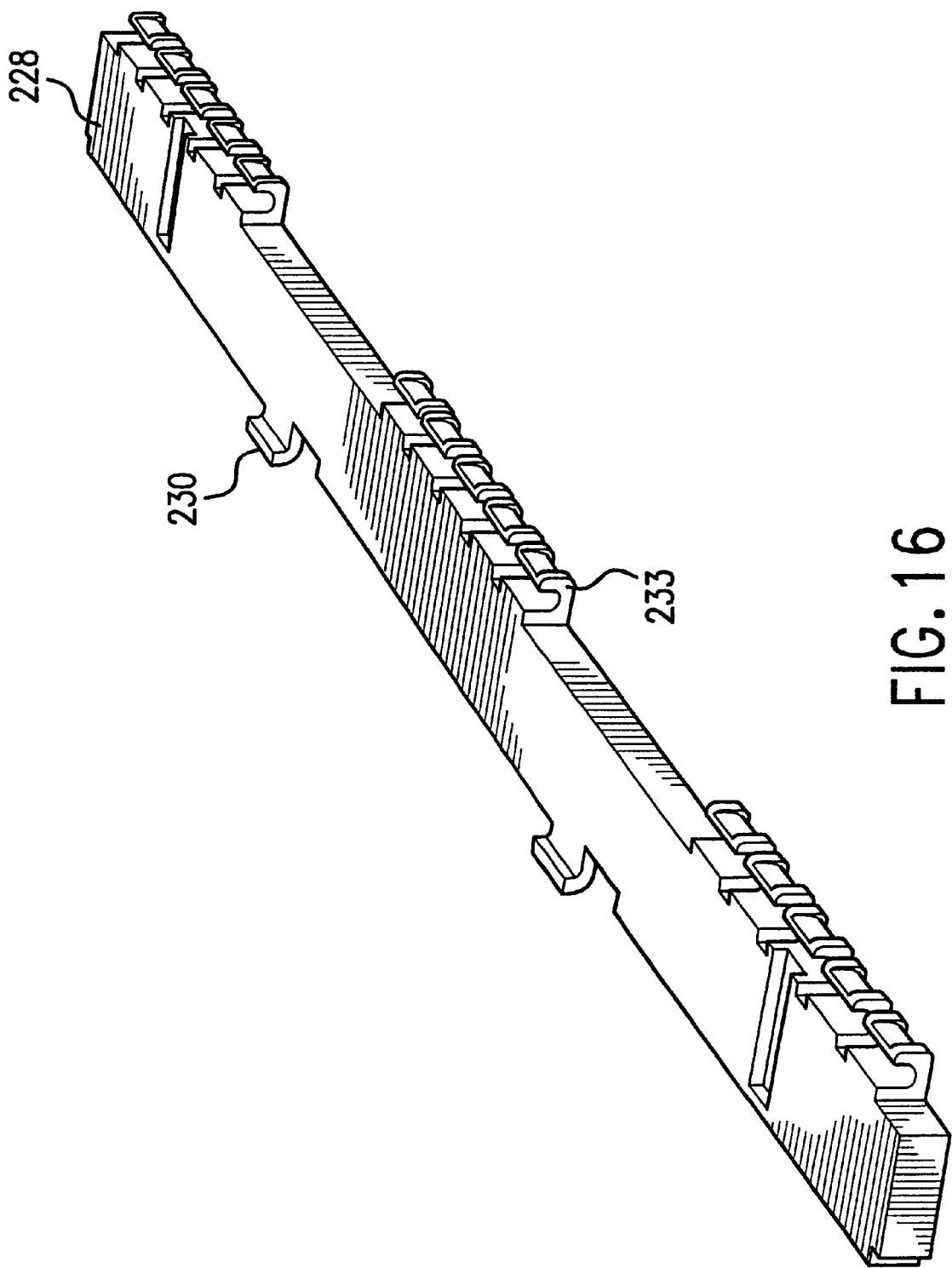
FIG. 16 is a top perspective view of a fixed portion of the collapsible shelf of FIG. 14.
Figure 17:
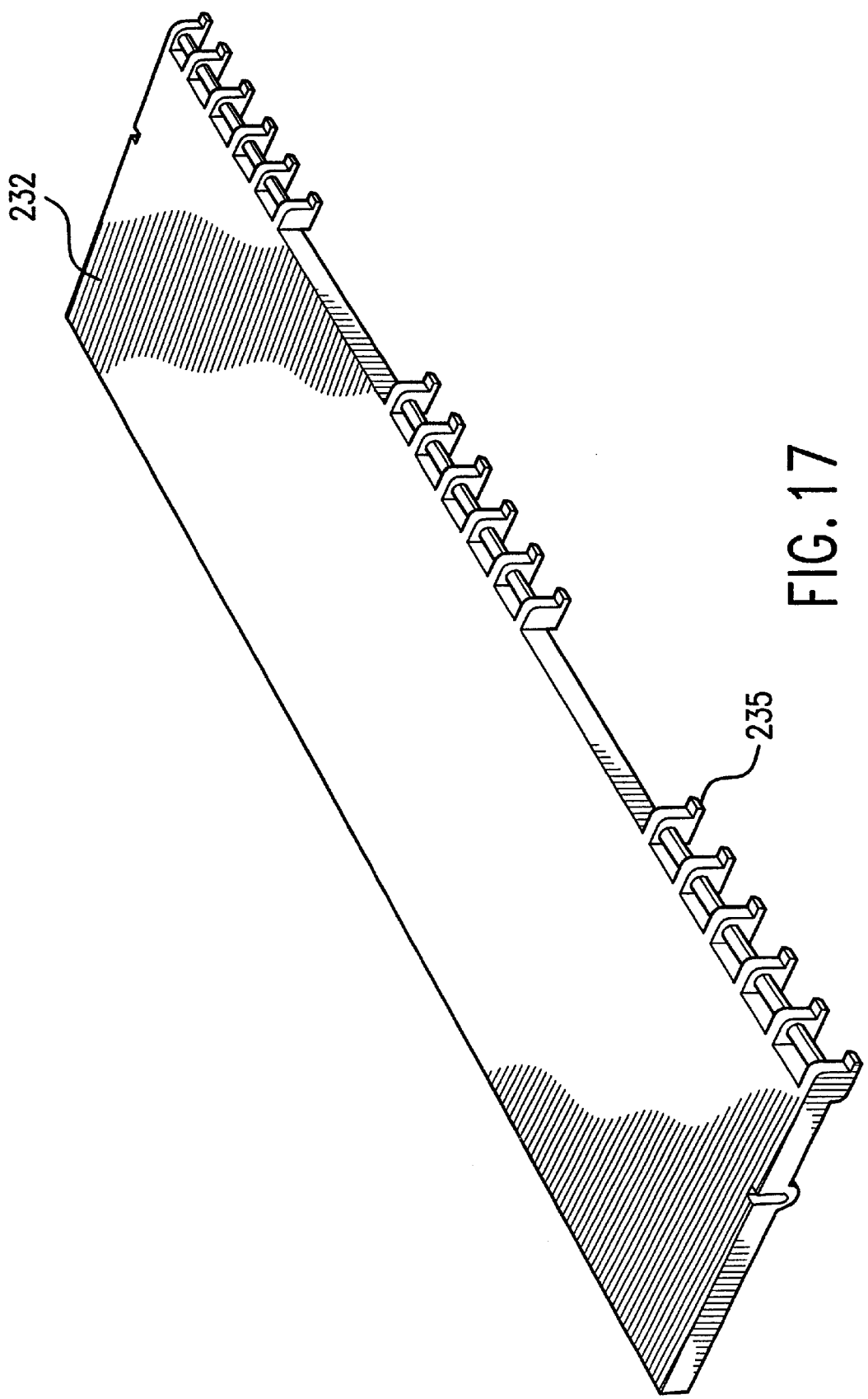
FIG. 17 is a top perspective view of a foldable portion of the collapsible shelf of FIG. 14.

As shown in FIGS. 16 and 17, each of the hinges 234 includes female hinge components 233 provided on one of the shelf portions 228, 232 and male hinge components 235 provided on the other of the shelf portions 228, 232. For instance, the female hinge components 233 may be provided on the narrower fixed portion 228 of each shelf 224, 226, and the male hinge components 235 may be provided on the wider movable portions 232 of each shelf 224, 226. As with all of the other hinge components in the collapsible cart 200, the hinge components 233 and 235 may be molded or otherwise integrated into the underlying structures, and need not be separate elements. Each hinge component 235 includes a lower lip 237 which prevents each shelf portion 232 from rotating below its intended open position, which is horizontal or at a slight upward tilt.

Referring again to FIG. 12, at least the first spine extension 208 and, desirably, the second spine extension 210, are provided with one or more handles 244 and, desirably, a foot hold 246. The handles 244 and foot hold 246 can be used by the mover to elevate one end of the cart forward (away from the mover) and/or tilt the cart backward (toward the mover) to help move the cart over a bump, up or down a ramp, or around an obstruction during manual transport. For instance, if a mover pulls the handles 244 and pushes the toe hold 246, the cart can be tilted backward. If the mover pushes the handles 244 and another mover, on the opposite end of the cart, pushes the corresponding toe hold 246, the cart can be tilted forward from the first mover. The handles 244 and toe hold 246 can be provided at any suitable verticle location on the outside of the first and second spine extensions 208, 210. Also, while the illustrated handles and toe hold are formed as openings in the first and second spine extensions, exterior handles and/or toe holds which protrude from the spine extensions may also be employed.

Other aspects of the collapsible cart of FIGS. 12 and 13 are similar to the embodiments described previously. Wheel assemblies 248, designed to accommodate heavy loads, may be positioned directly underneath each of the four doors 216, 218, 220 and 222. One or more additional wheel assemblies (not shown) may be positioned underneath the fourth spine extension 214. The wheel assemblies should be positioned underneath a load bearing structural member, instead of projecting outward, so as to avoid warping or shearing of the wheel assemblies when the collapsible cart is fully loaded with books or other heavy items. The positioning of the wheels, and the dimensions of the cart components, are such that the collapsible cart may stand on its own in either the open or closed configuration. Additionally, the collapsible cart 200 is designed for use in an upright position when the shelves and doors on one side of the cabinet spine 202 are open, and the shelves and doors on the other side of the cabinet spine 202 are closed.

Connecting arms 250, shown in FIG. 13, may be affixed to each of the first and second pluralities of shelves. A first connecting arm 250 may be affixed to each of the first plurality of shelves 224. A second connecting arm 250 may be affixed to each of the second plurality of shelves 226. Again, the connecting arms make it easier for a user to open and close all of the shelves on either side of the collapsible cart simultaneously, with only a single movement or effort.

Finally, each of the doors 216, 218, 220 and 222 may be provided with one or more support bodies 252 on its inner surface. The support bodies 252 can be grooves, projections, guides, handles, or any members which provide additional structural support underneath the individual shelves when the collapsible shelves 224, 226 and the foldable doors 216, 218, 220 and 222 are in their respective open positions. The support bodies 252 can also be vertically positioned to facilitate or enhance the slight upward tilting of the individual shelves 224, 226 as described above.

While in the foregoing specification this invention has been described in relation to certain embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A collapsible cart for transporting books, files, and other items, the collapsible cart comprising:
    a cabinet spine having a first surface, a second surface, a first side edge, a second side edge, a top end edge and a bottom end edge;
    a first spine extension mounted generally perpendicular to the cabinet spine along the first side edge of the cabinet spine;
    a second spine extension mounted generally perpendicular to the cabinet spine along the second side edge of the cabinet spine;
    a first plurality of collapsible shelves mounted to the first surface of the cabinet spine and between the first and second spine extensions, each of the first plurality of shelves including a narrower fixed portion mounted to the first surface of the cabinet spine and a wider movable portion pivotally mounted to the narrower fixed portion between the first and second spine extensions; and
    a plurality of wheels underneath the collapsible cart, for transporting the collapsible cart from one location to another location.

2. The collapsible cart of claim 1, further comprising a second plurality of collapsible shelves mounted to the second surface of the cabinet spine and between the first and second spine extensions, each of the second plurality of shelves including a narrower fixed portion mounted to the second surface of the cabinet spine and a wider movable portion pivotally mounted to the narrower fixed portion between the first and second spine extensions.

3. The collapsible cart of claim 1, wherein each narrower fixed portion comprises a ribbed surface.

4. The collapsible cart of claim 1, wherein each wider movable portion comprises a ribbed surface.

5. The collapsible cart of claim 1, wherein the first spine extension further comprises a handle.

6. The collapsible cart of claim 5, wherein the first spine extension further comprises a foot hold.

7. The collapsible cart of claim 5, wherein the second spine extension further comprises a handle.

8. The collapsible cart of claim 6, wherein the second spine extension further comprises a handle and a foot hold.

9. The collapsible cart of claim 1, further comprising a third spine extension mounted generally perpendicular to the cabinet spine along the top edge of the cabinet spine.

10. The collapsible cart of claim 1, further comprising a fourth spine extension mounted generally perpendicular to the cabinet spine along the bottom edge of the cabinet spine.

11. The collapsible cart of claim 1, wherein at least part of each of the first plurality of collapsible shelves, when in the open position, is tilted upward toward the cabinet spine.

12. The collapsible cart of claim 11, wherein the first spine extension extends a length of the first side edge of the cabinet spine, the second spine extension extends a length of the second side edge of the cabinet spine, the third spine extension extends a length of the top end edge of the cabinet spine, and the fourth spine extension extends a length of the bottom end edge of the cabinet spine.

13. The collapsible cart of claim 11, wherein at least one of the first and second spine extensions further comprises a handle.

14. The collapsible cart of claim 11, wherein at least one of the first and second spine extensions further comprises a foot hold.

15. A collapsible cart for transporting books, files and other items, the collapsible cart comprising:
    a cabinet spine having a first surface, a second surface, a first side edge, a second side edge, a top end edge and a bottom end edge;
    a first spine extension mounted along the first side edge of the cabinet spine;
    a second spine extension mounted along the second side edge of the cabinet spine;
    a first door pivotally mounted adjacent to the first spine extension, movable between an open position and a closed position;
    a second door pivotally mounted adjacent to the first spine extension, movable between an open position and a closed position;
    a first plurality of collapsible shelves mounted to the first surface of the cabinet spine and between the first and second spine extensions, each of the first plurality of shelves including a narrower first portion mounted to the first surface of the cabinet spine and a wider second portion pivotally mounted to the narrower first portion between the first and second spine extensions; and
    a plurality of wheels underneath the collapsible cart, for transporting the collapsible cart from one location to another location.

16. The collapsible cart of claim 15, further comprising:
    a third door pivotally mounted adjacent to the second spine extension, movable between an open position and a closed position;
    a fourth door pivotally mounted adjacent to the second spine extension, movable between an open position and a closed position; and
    a second plurality of collapsible shelves mounted to the second surface of the cabinet spine and between the first and second spine extensions, each of the second plurality of shelves including a narrower first portion mounted to the second surface of the cabinet spine and a wider second portion pivotally mounted to the narrower first portion between the first and second spine extensions.

17. The collapsible cart of claim 15, wherein each of the first and second doors comprises a support body for supporting the first plurality of collapsible shelves when the doors and shelves are in their respective open positions.

18. The collapsible cart of claim 17, wherein each of the first and second doors comprises a support body for supporting the first plurality of collapsible shelves, and each of the third and fourth doors comprises a support body for supporting the second plurality of collapsible shelves, when the doors and shelves are in their respective open positions.

19. A collapsible cart for transporting books, files, and other items, the collapsible cart comprising:

- a cabinet spine having a first surface, a second surface, a first side edge, a second side edge, a top end edge and a bottom end edge;
- a first spine extension mounted along the first side edge of the cabinet spine;
- a second spine extension mounted along the second side edge of the cabinet spine;
- a third spine extension mounted along the top end edges of the cabinet spine;
- a fourth spine extension mounted along the bottom end edge of the cabinet spine;
- a first plurality of collapsible shelves mounted to the first surface of the cabinet spine and between the first and second spine extensions, each of the first plurality of shelves movable between an open position and a closed position;
- a second plurality of collapsible shelves mounted to the second surface of the cabinet spine and between the first and second spine extensions, each of the second plurality of shelves movable between an open position and a closed position; and
- a plurality of wheels underneath the collapsible cart, for transporting the collapsible cart from one location to another location,
- wherein at least part of each of the first plurality of collapsible shelves, and at least part of each of the second plurality of collapsible shelves, is tilted upward toward the cabinet spine when in the open position.

20. The collapsible cart of claim 19, wherein the first spine extension extends a length of the first side edge of the cabinet spine, the second spine extension extends a length of the second side edge of the cabinet spine, the third spine extension extends a length of the top end edge of the cabinet spine, and the fourth spine extension extends a length of the bottom end edge of the cabinet spine.

21. The collapsible cart of claim 19, wherein at least one of the first and second spine extensions further comprises a handle.

22. The collapsible cart of claim 19, wherein at least one of the first and second spine extensions further comprises a foot hold.

* * * * *